United States Patent [19]

Roman

[11] 3,927,847
[45] Dec. 23, 1975

[54] FILM THREADING DEVICE

[75] Inventor: Robert J. Roman, Rochester, N.Y.

[73] Assignee: Eastman Kodak Company, Rochester, N.Y.

[22] Filed: Aug. 9, 1974

[21] Appl. No.: 496,240

[52] U.S. Cl. .................. 242/192; 226/92; 352/157
[51] Int. Cl.² .................. G03B 1/04; G11B 15/32
[58] Field of Search ............ 242/192, 195; 352/157, 352/158, 183; 226/91, 92

[56] References Cited
UNITED STATES PATENTS

| | | | |
|---|---|---|---|
| 1,927,062 | 9/1933 | Conn ................................. | 352/183 |
| 3,467,467 | 9/1969 | Walters ............................. | 352/183 |
| 3,558,077 | 1/1971 | Heinen ............................. | 242/192 |
| 3,724,777 | 4/1973 | Martin et al. ..................... | 242/195 |

FOREIGN PATENTS OR APPLICATIONS

| | | | |
|---|---|---|---|
| 1,284,282 | 11/1968 | Germany ......................... | 242/192 |
| 1,287,437 | 1/1969 | Germany ......................... | 242/192 |

*Primary Examiner*—Leonard D. Christian
*Attorney, Agent, or Firm*—J. Morrow

[57] ABSTRACT

A film threading device for a cinematographic apparatus comprises an endless drive belt having a plurality of projections or fingers which are engageable with a film strip or other strip material through an opening in the leading end of the material to separate the leading end from a supply roll of such material and to feed it to advancing means of the apparatus.

8 Claims, 5 Drawing Figures

FILM THREADING DEVICE

BACKGROUND OF THE INVENTION

1. Field of the Invention

The invention relates generally to threading devices for web materials and more particularly to a mechanism for a cinematographic apparatus for extracting the leading end of a film strip material from a supply roll and for feeding the leading end to film advancing means of the apparatus.

2. Description of the Prior Art

Film feeding mechanisms having continuous driving members are generally well known in the art. For example, commonly assigned U.S. Pat. No. 3,429,518 entitled, DEVICE FOR STRIPPING AND FEEDING STRIP MATERIAL FROM A ROLL issued in the name of E. S. McKee on Feb. 25, 1969 discloses a drive member comprising an endless film feeding belt which is movable into peripheral contact with a roll of film in a cartridge for imparting rotation to the roll in an unwinding direction and for guiding the end of film along a threading path established in part between the drive member and a cooperating stripper finger. Many changes or improvements have been made upon this basic type of feeding mechanism as described in commonly assigned U.S. Pat. Nos. 3,536,276; 3,628,748; 3,670,989; and 3,672,601.

Other less complex film threading mechanisms are also known in the motion picture projection art as, for example, commonly assigned U.S. Pat. No. 3,628,751 issued to G. Brauning et al on Dec. 21, 1971 entitled, AUTOMATIC THREADING DEVICE which discloses a pressure arm which is positionable to contact the leading end of film on a roll of film to cause the film to be readily displaced from the roll and into engagement with the teeth of a film capturing wheel which is being driven in a direction for engaging the leading end of film and feeding the film to self-threading portions of a motion picture projector or camera. While such a mechanism is less complex mechanically than previous mechanisms, it still requires linkages for coordination of movement of both the pressure arm and the film capturing wheel for the device to be reliable. Also, this mechanism is not readily adaptable for use with a wide range of roll sizes.

Another threading mechanism is disclosed in commonly assigned U.S. Pat. No. 3,724,777 issued to William A. Martin et al on Apr. 3, 1973 entitled, MOTION PICTURE PROJECTOR APPARATUS wherein a hook-like member is adapted to engage the edges of an opening located in the leading end portion of a roll of film as the roll is rotated in the unwinding direction. After engaging the film, the hook member then delivers the film to the self-threading apparatus of the projector. Similarly, commonly assigned U.S. Pat. No. 3,724,776 issued to Edward S. McKee on Apr. 3, 1973, entitled, FILM FEEDING APPARATUS discloses a hook-like member having guide members affixed thereto for cooperating with the flanges of a film reel for accurately positioning the hook with respect to the leading end portion of a roll of film upon the reel, thereby assuring engagement of the hook with the film such that the film can be withdrawn from the reel by the hook and fed to other feeding apparatus. While such a hook-like arrangement is suitable for certain types of apparatus, it may be desirable to use an improved driving belt arrangement such as disclosed in the present application for other types of apparatus.

SUMMARY OF THE INVENTION

An object of the present invention is to provide an improved threading device suitable for use with a roll of elongate web material wound into a roll, the device being relatively simple to manufacture and reliable in operation.

Another object of the invention is to provide a threading device having a driven belt engageable with a perforation in the leading end of a roll of material for extracting the end and leading it to other threading apparatus.

A further object of the invention is to provide a threading device having a driven belt which is suitable for use with a wide range of roll sizes or a web material furnished either in a cartridge or on an unenclosed film reel to engage the leading end of the material and to lead the end to other threading apparatus.

Still a further object of the present invention is to provide a threading device having an endless belt with at least one projection that is suitable for engaging a flexible web material through an opening in the leading end portion, the belt being adapted to be driven and thereby lead the material along a flat plane leading toward other threading apparatus, the endless belt not requiring the cooperation with other guide members or pressure members.

According to a preferred embodiment of the present invention, an improvement is provided for apparatus which supports a strip of film wound into a roll, the leading end portion of that strip having an opening therein and being separable from the roll during rotation of the roll in the unwinding direction, the improvement comprising and endless belt having a projection thereon suitable for engaging the leading end of film through the opening while the film is driven in a takeup direction, means supporting the endless drive belt for movement between positions wherein it is adjacent said loose end for engaging said end and wherein it is spaced from said loose end and means for rotatably driving said endless belt for initiating movement of the loose end of film in an unwinding direction.

The invention and its objects and advantages will become more apparent in the detailed description of the preferred embodiment presented below.

BRIEF DESCRIPTION OF THE DRAWINGS

In the detailed description of the preferred embodiments presented below, reference is made to the accompanying drawings in which.

DESCRIPTION OF THE PREFERRED EMBODIMENT

Because photographic apparatus are well known, the present description will be directed in particular to elements forming part of, or cooperating more directly with, the present invention, apparatus not specifically shown or described herein being understood to be selectable from those known in the art.

Figure 1:
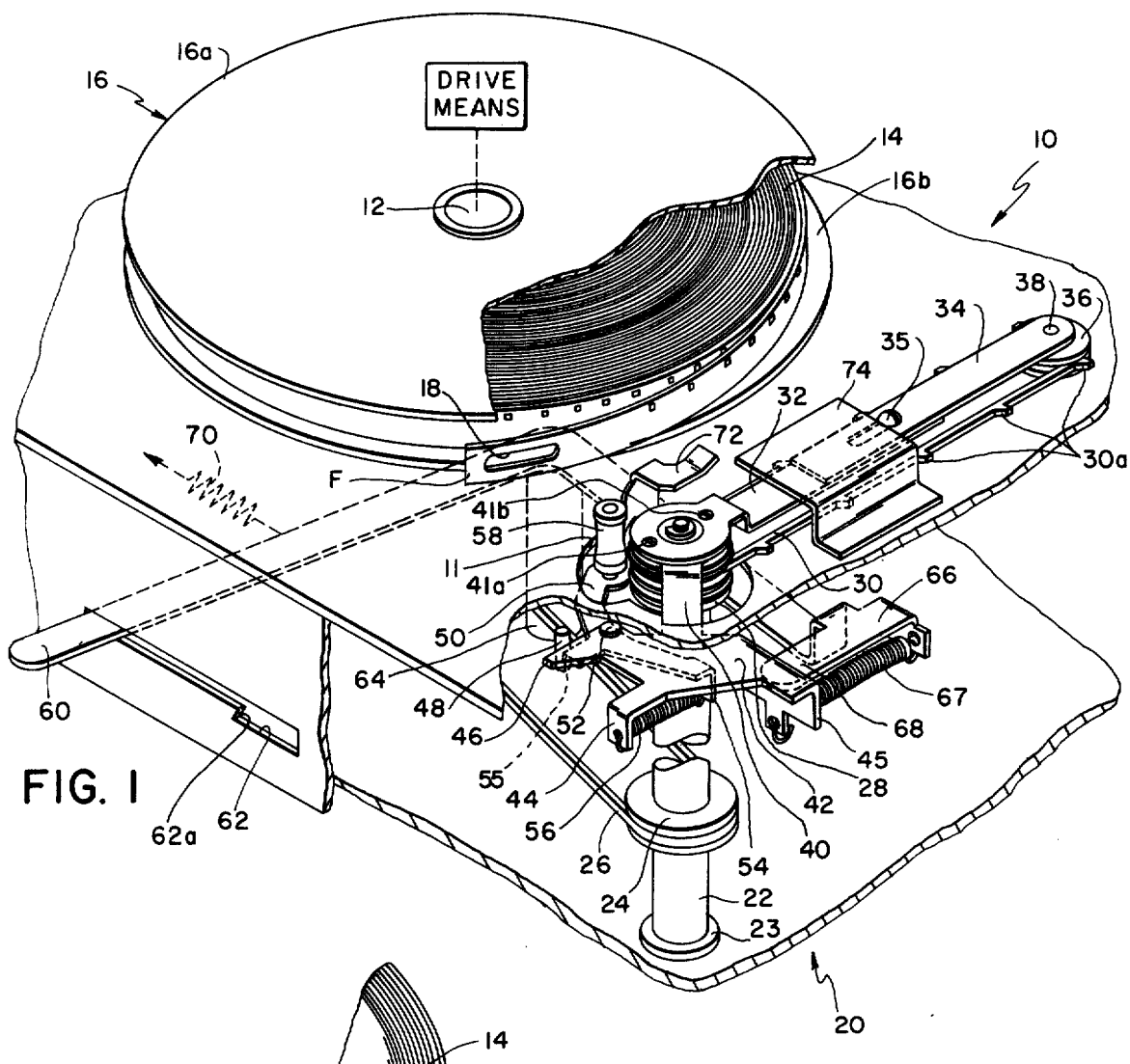
FIG. 1 is a fragmentary perspective view illustrating a preferred embodiment of the film threading device of the present invention in a position wherein it is spaced from the leading end portion of a roll of film, such as for loading or removing the roll of film from the device.

Referring now to the drawings, there is shown a portion of a cinematographic apparatus, such as a motion picture projector, which comprises a generally box-like housing 10 supporting a supply spindle 12 such that it can be rotatably driven in a counterclockwise or take-up direction by drive means (shown schematically in FIG. 1). Supply spindle 12 preferably rotates about a vertical axis and is suitable for receiving and supporting a supply roll 14 of convoluted film F in a generally horizontal plane above the housing 10 so as to serve as a supply roll for the apparatus. For purposes of illustration, the supply roll 14 is shown wound onto a film reel 16 having flanges 16a and 16b. However, the present invention is also suitable for use with a roll of film which is supported by a core without flanges and is also suitable for use with a roll of film contained within a film cartridge. Preferably, the leading end of the film F includes a suitable elongate opening or perforation 18 for cooperating with a portion of the threading device of the present invention as will be explained later such that the leading end of film can be extracted from the roll and supplied to other film advancing members of the cinematographic apparatus.

As best illustrated in FIG. 1, a mechanism plate 20 is secured under the housing 10 and the mechanism plate supports a bushing 23 in which the lower end of a shaft 22 is mounted for rotation. A pulley 24 is secured to the shaft 22 between the mechanism plate 20 and the housing 10 and a driving belt 26 passes around the pulley 24 for selectively driving the shaft 22 synchronously with shaft 12 through the driving belt 26 and other drive means (not shown). When rotational movement is imparted to the shaft 22 by the driving belt 26, shaft 22 drives the film threading device of the present invention as will now be explained.

A pulley 28 is secured to the shaft 22 and pulley 28 is positioned immediately above the housing 10 through the irregularly shaped opening 11. The pulley 28, together with a pulley 36, supports an endless elastic belt 30 such that it can be rotatably driven to engage and thread the film F from the supply roll 14 as will be described later. As shown in the drawings, the pulley 36 is supported a predetermined distance from the pulley 28 by the supporting members 32 and 34 which are joined together in a sliding, adjustable manner by a screw 35 so as to permit adjustment of the tension in the elastic belt 30. Preferably, supporting member 32 is affixed to a bearing member 33 which in turn is affixed to the top end of the shaft 22. This arrangement permits horizontal movement of the elastic belt 30 through movement of the supporting members 32 and 34 between the idle (FIG. 1) position and the threading (FIG. 2) position with only a limited amount of deflection of the supporting members 32 and 34 so as to insure proper transverse positioning of the elastic belt 30 in the same plane as the opening 18 in the film F.

An arm portion 40 of an irregularly shaped bracket 42 extends upward through the opening 11 in the housing 10 at a spaced distance from the peripheral edges of the pulley 28. As shown in FIG. 1, that end of the arm portion 40 which is above the pulley 28 is bent to form approximately a right angle with respect to the part of the arm portion 40 extending through the opening 11 such that the end of the arm portion 40 is then positioned immediately below the supporting member 32 and the bearing 33. In the preferred embodiment illustrated, screws 41a and 41b connect the arm portion 40 to the supporting member 32 such that movement of the bracket 42, in a manner which will be described later in greater detail, is effective to control the horizontal movement of the elastic belt 30 from the idle (FIG. 1) position to the threading (FIG. 2) position.

In the preferred embodiment of the threading device shown in the drawings, a generally L shaped threading lever 60 is provided for conditioning the elastic belt 30 for threading the leading end of film from the received roll 14. Threading lever 60 is pivotally mounted for horizontal movement through a stud shaft 64 which extends upwardly from the mechanism plate 20 (see FIG. 2). The threading lever 60 is resiliently urged in a clockwise direction about the stud shaft 64 toward the idle (FIG. 1) position by a spring 70 shown diagrammatically. In this position, a first end of the threading lever 60 extends through an elongate opening 62 in a vertical portion of the housing 10 such that it is readily accessible to the operator and the second end of the threading lever 60 extends under the housing 10 wherein it is operatively coupled to bracket 42 for conditioning the threading device as will be explained.

As best shown in FIG. 1, a control member 66 which includes a rounded tab 68 is secured to the second end of the threading lever 60 wherein the tab 68 is movable into contact with a bent down tab 45 of the bracket 42 for urging the bracket in a counterclockwise direction about the shaft 22 toward the idle (FIG. 1) position. When in the idle position, a stop 46 of bracket 42 is urged into contact with the stop member 48 under the urging of the spring 70 and the stop 46 restrains the bracket 42 from further rotation in the clockwise direction about the shaft 22. Also, while in this position, a stop 55 of a crank arm 50 is urged into engagement with the stop 48 effectively pivoting the crank arm 50 in a counterclockwise direction about the rivet 52 which secures the crank arm to the bracket 42 thereby removing the stripping roller 58 which is supported by the crank arm 50 from engagement with the peripheral edge of the pulley 28. As will be described in greater detail later, crank arm 50 is normally urged in the clockwise direction about rivet 52 to the position shown in FIGS. 2 and 5 wherein the stripping roller 58 is urged into engagement with the pulley 28 by the urging of spring 56.

Figure 2:
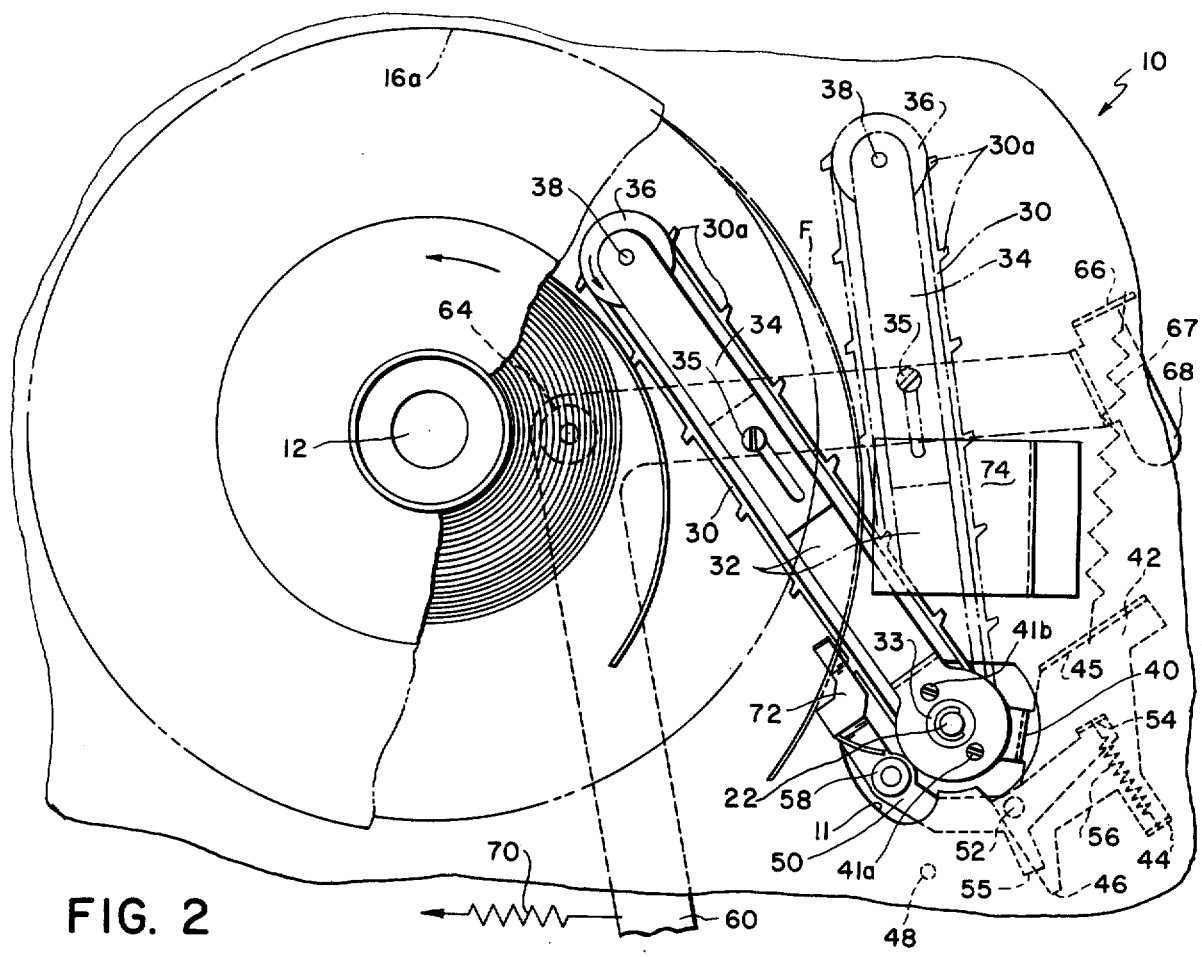
FIG. 2 is a plan view showing in solid lines the film threading device in a first actuated position wherein it can cooperate with the leading end portion of a small roll of film and showing in phantom the device in a second actuated position wherein it can cooperate with the leading end portion of a large roll of film.

When the operator moves the threading lever 60 to the right, toward the position shown in FIG. 2, the selection lever is urged in the counterclockwise direction about shaft 64 and the bracket 42 is urged in a counterclockwise direction about the shaft 22 by the spring 67 which interconnects a tab 45 of bracket 42 and a portion of the control member 66. The counterclockwise movement of the bracket 42 results in the supporting members 32 and 34 also being urged in a counterclockwise direction about shaft 22 through the mechanical linkage of the arm portion 40 of the bracket 42 and the supporting member 32. As the threading device is moved toward the threading (FIG. 2) position, the stop portion 46 of the bracket 42 is removed from contact with the stop member 48 as is the stop portion 55 of the crank arm 50. When the threading lever 60 is moved to the far right end of the elongate opening 62 it may be depressed slightly wherein it can engage the lip 62a which is provided for restraining the threading lever 60 in the threading (FIG. 2) position against the resilient urging of the spring 70. This positioning of threading lever 60 results in the corresponding counterclockwise movement of bracket 42 which is effective to move the supporting members 32 and 34 through a range of positions as indicated in FIG. 2 wherein the endless belt member 30 is urged into engagement with the outer convolution of the roll of film 14.

Figure 3:
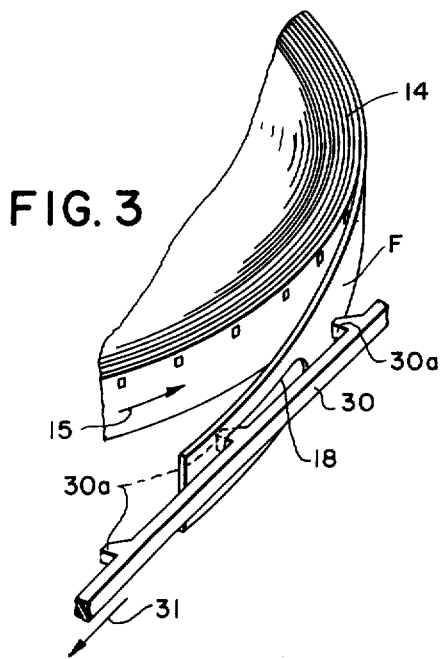
FIG. 3 is a fragmentary perspective view showing a portion of the film threading device positioned as shown in solid lines in FIG. 2 wherein the device engages the leading end portion of a roll of film through an opening therein for extracting the leading end from the roll.

Referring now in detail to FIG. 3, it should be noted that the endless elastic belt 30 includes a plurality of hook-like projections identified as 30a which are suitably shaped for engaging the edge of the opening 18 in the leading end of the supply roll 14. In the preferred embodiment shown, movement of the threading lever 60 to the threading (FIG. 2) position actuates the drive means of the apparatus to drive the supply roll in the counterclockwise or film take-up direction as indicated by the arrow 15. As is well known, rotating the film roll in this direction results in the outer convolution of film being separated and displaced radially from the roll such as illustrated in FIG. 2.

The movement of the threading lever 60 to the threading (FIG. 2) position also actuates the driving belt 26 for driving the endless belt 30 in a clockwise direction as indicated by arrow 31. In the preferred embodiment, movement of the threading lever 60 toward the threading (FIG. 2) position opens switch 61 permitting the drive means to be actuated. As a result, the projections 30a on the endless belt 30 are then driven past the opening 18 until one of the projections engages the edge of the opening 18 as shown in FIG. 3. When this occurs, the force applied to the film F by the endless belt 30 through the projection 30a is sufficient to overcome the driving force of the drive means of the apparatus and the end of the film is withdrawn from the roll. Continued advancement of the endless belt 30 with the film engaged by the projection 30a results in the film being moved parallel to a portion of the belt 30 and then directed to the nip between the pully 28 and the stripping roller 58 for stripping the film from the projection 30a and then feeding it to other apparatus, not shown.

Figure 5:
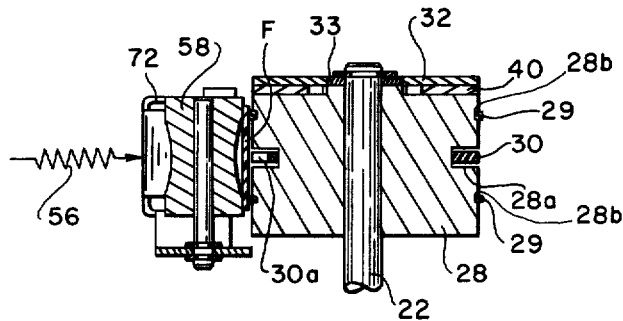
FIG. 5 is a sectional view taken along line 5—5 of FIG. 4 showing the film being stripped from the threading device.

Referring now to FIG. 5, the film F is shown being stripped from the projection 30a of the endless belt 30 as a result of the cooperation of the pulley 28 with the stripping roller 58. As viewed in the drawing, the pulley 28 includes an undercut surface 28a in which the endless elastic belt 30 is positioned. The undercut portion 28a is preferably of a depth which is slightly in excess of the width of the endless belt 30 as taken through a cross-section of a portion of the belt 30 which includes a projection 30a such that when the elastic belt 30 passes around the pulley 28, the film is retained taut between the pulley 28 and the stripping roller 58 and the projection 30a is then withdrawn from the opening 18. In the preferred embodiment, two "0" rings 29 surround the pulley 28 in indentations 28b which are in the pulley 28 at a spaced distance from the undercut 28a. The spacing between the "0" rings 29 is slightly less than the width of the film F such that the "0" rings 29 cooperate with the edges of the film F to maintain the film taut therebetween and such that the film F can be more positively driven between the pulley 28 and the stripping roller 58. As previously mentioned, the stripping roller 58 is resiliently urged into contact with the pulley 28 by the spring 56 for driving the film therebetween. In the preferred embodiment, the outer surface of the stripping roller 58 includes a concave surface 58a which prevents scratching of the portion of the film F which contains the image frames and also permits the film F to be bowed slightly away from the projection 30a of the endless belt 30 if the film is stretched slightly due to the contact between the film and the projection 30a.

Figure 4:
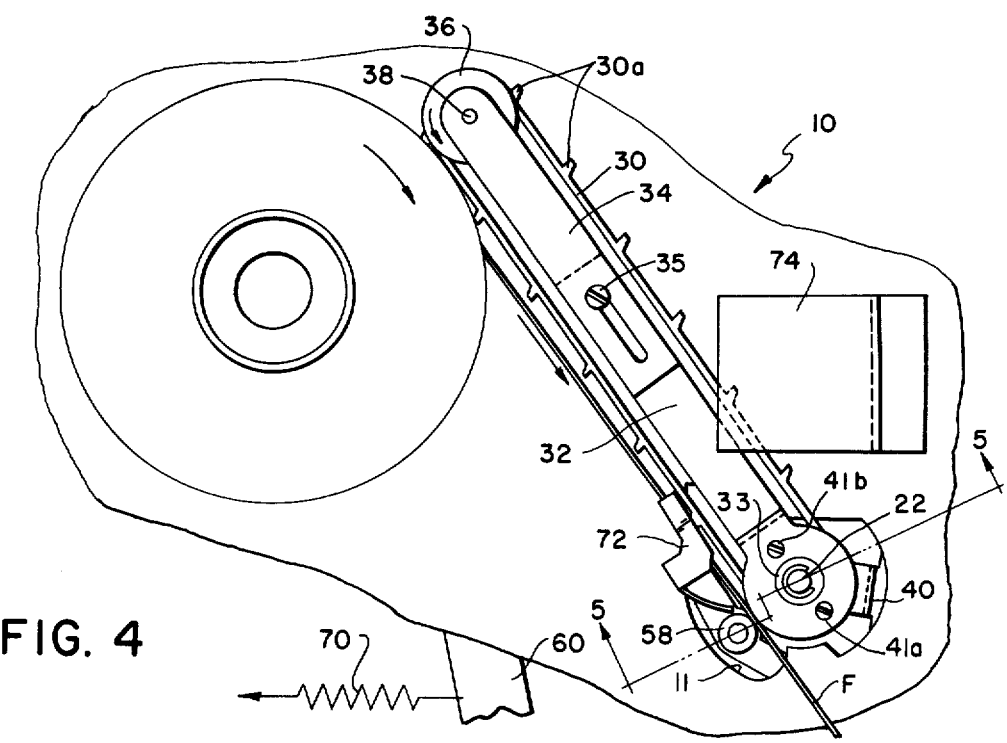
FIG. 4 is a plan view similar to FIG. 2 and showing the leading end portion of the film separated from the roll and guided to other threading apparatus.

As shown in FIG. 4, the threading device of the present invention includes a guide member 72 which is affixed to the end of the crank arm 50 and partially surrounds the film path which leads to the nip defined between the pulley 28 and the stripping roller 58. This guide member would serve to deflect the film F toward the nip should the film become removed from the projection 30a as the film as being led toward the nip by the endless belt 30. It should be noted from the foregoing discussion of the present invention that the elastic belt 30 is suitable for directing the film F along a flat plane between the pulleys 28 and 36 without the necessity of cooperation of the film with guide members or pressure members. The guide member 72 is provided only as safety feature to prevent difficulties if the mechanism were to malfunction for some unforseen reason.

Once the film F has been fed to the pulley 28 and the stripping roller 58, it can be readily supplied to other apparatus (not shown) and the threading device need no longer remain in the threading (FIG. 2) position. To remove the endless belt 30 from the threading position the operator need only remove the threading lever 60 from engagement with lip 62a and permit the threading lever to return to the idle (FIG. 1) position under the resilient urging of spring 70. The movement of the threading lever 60 to the idle (FIG. 1) position results in stripping roller 58 being withdrawn from contact with the pulley 28 and being moved a spaced distance from the pulley 28. When stripping roller 58 is in this position, the film F is permitted to be freely moved between the stripping roller 58 and the pulley 28. This movement results in stripping roller 58 being withdrawn from contact with the pulley 28 and moved a spaced distance therefrom such that the film F is permitted to be freely moved therebetween. Although in the preferred embodiment shown, the movement of the endless belt 30 and the stripping roller 58 from the threading position to the idle position is achieved by the operator moving the threading lever 60, it is possible to provide a sensing mechanism (not shown) to sense the presence of the film between the roll 14 and the pulley 28 for automatically returning the threading mechanism to the idle (FIG. 1) position.

Also included in the preferred embodiment is a cover 74 which is affixed to the housing 10 and extends over the supporting members 32 and 34. This cover is provided to assure that the supporting members 32 and 34 are not moved out of alignment by accidental contact by the supply roll 14 as it is being mounted on or removed from the supply spindle 12.

The invention has been described in detail with particular reference to a preferred embodiment thereof, but it will be understood that variations and modifications can be effected within the spirit and scope of the invention.

I claim:

1. For apparatus having a spindle adapted to support a roll of film having a leading end portion having an opening defined therein, said spindle being adapted to rotatably drive the roll in a take-up direction such that the leading end is separated from the roll, the improvement comprising:
   a. an endless drive belt including at least one projection suitable for engaging said leading end of film through said opening as the roll is being rotatably driven by the spindle in the take-up direction;
   b. means for supporting said endless drive belt to be driven in a threading direction opposed to said take-up direction, said support means being pivotally supported by the projector for movement between (1) a first position wherein said belt is spaced from said leading end and (2) a second position wherein said projection on said belt is spaced from said roll and is engageable with said leading end through said opening; and
   c. means for driving said endless belt in said threading direction and for rotatably driving the spindle in the take-up direction when said means for supporting said endless drive belt is in said second position for initiating threading of the leading end of the film from the roll.

2. The improvement as set forth in claim 1 wherein said endless drive belt includes a plurality of spaced projections, each of said projections being suitable for engaging said leading end of film through said opening.

3. The improvement as set forth in claim 1 wherein said improvement further comprises resilient means for urging said supporting means toward its first position.

4. Apparatus as set forth in claim 1 wherein said support means includes a pulley having a groove defined therein for receiving said endless drive belt as said endless drive belt is driven such that said projection is removed from the opening in said film while said film is being advanced.

5. Cinematographic apparatus having a film path and having means for supporting a roll of film, said film roll having a leading end portion with at least one opening defined therein, said apparatus comprising:
   a. means for driving said film roll in a take-up direction whereby the leading end portion tends to separate from the roll during rotation of the roll in the take-up direction;
   b. an endless drive belt having at least one projection suitable for engaging the leading end portion of the film through the opening in the film while the film roll is driven in the take-up direction and for conveying the film along a portion of the film path;
   c. means for supporting said endless drive belt to be driven in an unwinding direction opposed to the take-up direction and for pivotally moving said endless drive belt between (1) a first position wherein said projection on said endless drive belt is spaced from said roll and is effective to engage the leading end portion of the film through the opening and (2) a second position wherein said endless drive belt is ineffective to engage the leading end portion;
   d. means for effecting a threading cycle for feeding the leading end portion of the film from the roll, said means for moving said support means and positioning said endless drive belt in said first position at the beginning of said threading cycle so that the projection on said endless drive belt and the leading end portion of the film roll are brought into engagement during rotation of the film roll in said take-up direction; and
   e. means for driving said endless drive belt when in said first position for initiating movement of the leading end portion of the film in said unwinding direction.

6. Cinematographic apparatus as set forth in claim 5 wherein said endless drive belt has a plurality of spaced projections each of which is suitable for engaging said loose end of film through said opening.

7. For apparatus having a spindle for supporting a roll of web material having a leading end with an opening defined therein, said spindle being adapted to be rotatably driven in a take-up direction to separate the leading end from the roll, an improvement comprising:
   a. an endless belt including at least one projection suitable for engaging the leading end through said opening;
   b. means for supporting said endless belt for driving and for movement between (1) a first position wherein said endless belt is spaced from said leading end and (2) a second position wherein said projection in said endless belt remains spaced from said roll and adjacent to the leading end such that said projection is engageable through the opening therein; and
   c. means for driving said endless belt in a threading direction opposed to the take-up direction while said support means is supporting said endless belt in said second position and while said spindle is driven in the take-up direction whereby said projection engages the leading end and initiates movement of said leading end from said roll.

8. The improvement as set forth in claim 7 wherein said means for supporting and moving said endless belt comprises:
   a. a member pivotably mounted to said apparatus for movement between said first and second positions; and
   b. first and second pulleys rotatably supported by said member, said pulleys being adapted to carry said endless belt as it is driven, one of said pulleys having a recess defined therein for receiving said endless belt such that said projection is removed from the opening in the web material as it is being advanced past said one pulley.

* * * * *